Patented Sept. 6, 1949

2,481,344

UNITED STATES PATENT OFFICE 2,481,344

FLUORESCENT ZINC OXIDE PIGMENTS

Lawrence J. Reimert and Erastus A. Fatzinger, Palmerton, Pa., assignors to The New Jersey Zinc Company, New York, N. Y., a corporation of New Jersey No Drawing. Application June 13, 1947, Serial No. 754,590

9 Claims. (Cl. 252—301.6)

This invention relates to luminescent pigments and, more particularly, to a fluorescent pigment composed of zinc oxide and magnesium oxide as a base material which acts as a wholly different material than either of its individual components.

It is known that zinc oxide can be treated so as to render it luminescent. All early attempts to activate zinc oxide resulted in a pigment having only a faint fluorescence. More recent accomplishments in this field have produced zinc oxide pigments of brighter fluorescence by special treatment such as calcination in a reducing atmosphere. For example, Eisenbrand and Siewert, in Archiv der Pharmazie, 1934 vol. 272, pages 440–451, have shown that the faint fluorescence of zinc oxide can be materially increased by heating the material in an atmosphere of hydrogen or of hydrogen and water vapor. Similar results have been described in British Patent No. 558,213. Beutel and Kutzelnigg, in Monatsheft für Chemie, 1932, vol. 61, pages 69–86, describe similar results obtained by subjecting zinc oxide to a flame of illuminating gas. It has also been shown that the fluorescence of zinc oxide may be increased by heating it in an atmosphere of hydrogen or illuminating gas in the presence of sulfur, the sulfur being present either as a normal impurity in a particular grade of zinc oxide or added in the form of elemental sulfur, as a sulfide, or as sulfur dioxide. United States Patent No. 2,408,475 to Nickle describes the production of a fluorescent zinc oxide by calcining it in a reducing atmosphere in the presence of an activator such as a bismuth compound.

Magnesium oxide has been used as an anti-flux in the preparation of luminescent pigments of the sulfide-type. So far as we are aware, magnesium oxide as such has not successfully been activated to an extent which would make it commercially useful.

We have discovered, however, that the addition of a minor amount of magnesium oxide to zinc oxide, in the presence of a small added amount of lithium sulfate, makes possible the production of a brilliantly fluorescent pigment by calcination in a reducing atmosphere. Extensive investigation indicates each of those three ingredients— zinc oxide, magnesium oxide and lithium sulfate— must be present to produce the fluorescent characteristic of the activated product. We have found no effective substitute for any of these ingredients.

The zinc oxide and magnesium oxide components used in preparing the novel product of our invention may be the oxides themselves, or either or both of these components may be used in the form of a compound, such as the carbonate, which may be thermally decomposed during calcination to form the oxide. In general, we prefer to use zinc oxide as the zinc component because of its availability in finely divided and relatively pure form. Magnesia may be used effectively as the magnesium component, although magnesium carbonate appears to offer an advantage in permitting lower calcination temperature presumably because of the greater reactivity of the magnesium oxide as it is produced by decomposition of the carbonate over the reactivity of a previously prepared magnesium oxide.

The chemical purity of the components of our novel pigment should be high. Pigments of good fluorescent qualities have been obtained using C. P. grades of zinc oxide, magnesium oxide and lithium sulfate. The most satisfactory fluorescence has been obtained, however, by the use of U. S. P. zinc oxide and special "luminescent grades" of magnesium oxide, both of which are readily available on the market. The "luminescent grade" magnesium oxide referred to herein is the material which has been used heretofore as an anti-flux added in the preparation of luminescent pigments of the sulfide-type. Ordinary commercial grades of zinc oxide, magnesium oxide and lithium sulfate may be used, although the impurities normally present in these components seriously degrade the ultimate fluorescence of the final product.

The proportions of the components comprising the base material of our fluorescent products (zinc oxide and magnesium oxide), may vary over a considerable range. Although fluorescent products have been obtained in which the zinc oxide and magnesium oxide were present in substantially equal parts by weight (i. e., 50% each), we have found that the magnesium oxide should comprise a minor proportion, and preferably not more than about 40%, of the zinc oxide-magnesium oxide mixture. Satisfactory products have been prepared in which the magnesium oxide comprised as little as about 3% and as much as about 40% of the zinc oxide-magnesium oxide mixture, although proportions near each of these extremes lead to considerably less fluorescence and a more pronounced color to the fluorescence than the optimum proportion of about 12% magnesium oxide. The optimum proportions of about 88% zinc oxide and about 12% magnesium oxide yield an activated product characterized by a brilliant white fluorescence with a slight bluish tint. With decreasing amounts of magnesium oxide below 12% the color of the fluorescence assumes a greenish tinge, and with 6% magnesium oxide the product has a very pale bluish-green fluorescence. Amounts of magnesium oxide greater than about 12% increase the bluish tinge of the fluorescence and tend to degrade the brightness of the fluorescence. However, even with 40% magnesium oxide good fluorescent brightness is obtained.

In the complete absence of magnesium oxide the near-white characteristic fluorescence of our novel product cannot be obtained, and no luminescence is obtained in the absence of zinc oxide. The magnesium oxide does not serve merely as a diluent but appears to enter into some combination with zinc oxide to produce a base material of wholly different characteristics than zinc oxide or magnesium oxide alone. For example, a calcined mixture consisting only of zinc oxide and magnesium oxide in the optimum proportions of 88% and 12%, respectively, shows by X-ray diffraction a pattern substantially characteristic of zinc oxide alone, thus indicating that the magnesium oxide combines with the zinc oxide to form a solid solution of magnesium oxide therein. The X-ray diffraction pattern of this optimum composition is somewhat more diffuse than that of zinc oxide without any added magnesium oxide and renders uncertain the determination of a possible shift in the zinc oxide lattice constants which would otherwise be more conclusive evidence of solid solution. However, there is further indirect evidence of solid solution in the optimum composition in that at an elevated temperature just below incandescence the composition does not show the intense yellow color characteristic of zinc oxide alone at this temperature.

As pointed out hereinbefore, the presence of lithium sulfate in the zinc oxide-magnesium oxide mixture is required for development of the characteristic fluorescence of our products. No other lithium compound or other material has been found capable of producing the results obtained with lithium sulfate. For example, no other sulfate has been found to be effective, and other sources of sulfur such as elemental sulfur and sulfur dioxide, which are effective in activating zinc oxide alone in a reducing atmosphere, are of no utility in producing the products of the present invention in the absence of lithium sulfate. Even a mixture of lithium fluoride and sulfur has been found to be without effect.

The amount of lithium sulfate which is effective in producing the activated products of the invention appears not to be critical. As little as 0.5% and as much as 4.9% of $Li_2SO_4 \cdot H_2O$ has been used to obtain fluorescent brightness which is only slightly below the maximum obtainable with the optimum amount of about 2% of this compound. Within the foregoing range, the amount of added lithium sulfate has some effect upon the texture of the resulting pigment, the highest amount of lithium sulfate within said range producing a pigment of the poorest texture. However, the differences in texture so produced are not large, and the effect of increasing amounts of lithium sulfate may be counteracted by control of the calcination temperature and period. We have found that the effective amount of lithium sulfate may be reduced appreciably when a small amount of sulfur dioxide is included in the calcination atmosphere. For example, effective results have been obtained with as little as 0.25% lithium sulfate when about 2.5% by volume of sulfur dioxide is added to the calcination atmosphere.

The zinc oxide, magnesium oxide and lithium sulfate should be intimately admixed prior to calcination. Mixing may be effected by any of the usual procedures, such as by wet or dry ballmilling, by passage of a rough blend through a Mikropulverizer, or by agitation in an aqueous slurry of moderate consistency. The lithium sulfate may be incorporated with the ingredients of the base material in the dry state, or the lithium sulfate may be added to the dry base material in the form of a solution or suspension in a volatile medium, such as water or alcohol, which is sprayed onto the dry components. The lithium sulfate may also be incorporated in the base material by dissolving it in the aqueous medium used to produce a slurry of the base material components. The order in which the materials are incorporated in the mixture appears to be unimportant provided effective mixing is obtained. However, in order to insure a good dispersion of the lithium sulfate in the slurry procedure, it is advisable to add the lithium sulfate to the water prior to the addition of the other ingredients which thicken the slurry. In any type of wet mixing procedure, the wet mixture should be dried prior to calcination without preliminary filtering so as to avoid the loss of lithium sulfate in the aqueous phase. The dried material should be pulverized in order to minimize any tendency towards aggregation during subsequent calcination.

Calcination of the zinc oxide-magnesium oxide-lithium sulfate mixture should be effected in the form of a loose charge subjected to a minimum of packing in order to obtain best results. The calcination furnace chamber may be of any suitable refractory material of reasonable purity such, for example, as silica, Alundum, magnesia or beryllia. The calcination chamber should be gas-tight in order to permit maintenance therewithin of the desired reducing atmosphere. We prefer to effect calcination in a moving reducing atmosphere, and accordingly the preferred calcination chamber construction is one which is provided with a water-seal for the escape of effluent gases.

The calcination temperature is preferably within the range of about 850° to about 1000° C. The calcination period may range from 15 minutes to 4 hours with any temperature within the aforementioned temperature range with only small variations in ultimate fluorescent brightness of the calcined product. The preferred calcination conditions, which produce maximum brightness regardless of the proportions of ingredients in the mixture, comprise treatment for about one hour at a temperature of approximately 900° C. in a moving reducing atmosphere.

The reducing atmosphere required for activation of the zinc oxide-magnesium oxide-lithium sulfate mixture in accordance with the invention may be provided by hydrogen, carbon monoxide, various gaseous hydrocarbons, or mixtures thereof. Of these reducing gases, hydrogen is preferred. We have found it advantageous, however, to dilute the reducing gas with carbon dioxide or water vapor, both of which are capable of reoxidizing some of the zinc vapor produced by calcination in the presence of the reducing gases. Carbon dioxide has been found to be the more convenient to use. A neutral diluent gas such as nitrogen has been found to be not satisfactory. The extent of dilution of the reducing gas with a mild oxidizing gas may vary over a substantial range. A 50% dilution (by volume) is presently preferred, although this figure is not critical. More effective and consistent results have been obtained using a 50% or greater dilution than when using less than 50% dilution. Accordingly, it can be said that optimum activation can be obtained by calcination for about 1 hour at about 900° C. in a moving atmosphere consisting of a 50–50 mixture by volume of hydrogen and carbon dioxide. The further presence of a small amount of sulfur dioxide in the calcination atmosphere, for example up to about 5% by volume, has been found to be advantageous. As previously pointed out, the presence of sulfur dioxide makes possible the use of smaller amounts of lithium sulfate.

The rate at which the predominately reducing atmosphere is caused to flow through the calcining furnace for optimum results cannot be stated categorically because it depends to a considerable extent upon the dimensions and shape of the furnace chamber and the size of the charge to be calcined. The rate of flow of atmosphere through the furnace can be readily determined by experimentation and should be held to the minimum required for activation so that vapors of reduced zinc will not be carried away in the effluent gas.

At the end of the calcining period the product should be cooled, and preferably slowly, to a temperature of 400° C., or less, before being exposed to the ambient atmosphere. Slow cooling enhances the degree of activation of the product. Such cooling can be effected by discontinuing heating of the furnace and allowing the furnace to cool without any artificial cooling other than that obtained by continuance of the flow of the reducing atmosphere therethrough. If air or oxygen is admitted to the calcination chamber during the cooling period, the fluorescent color and brightness of the product are seriously degraded.

Fluorescent products produced by calcination as hereinbefore described are of pigment fineness and quality and do not ordinarily require further grinding. These products may, however, be wet ballmilled to somewhat greater fineness without appreciably degrading their fluorescent properties.

The fluorescent qualities of the pigments produced in accordance with the invention are unusual for an oxide-type pigment. As previously pointed out, pigments produced with the optimum proportions of zinc oxide and magnesium oxide (88% and 12%, respectively) fluoresce with a brilliant white color having a slightly bluish tint upon excitation by long wavelength ultraviolet radiation. The pigments are particularly susceptible to excitation with 3650 Å. radiation. The products also fluoresce well in response to 2537 Å. excitation, although in the case of the optimum proportions of zinc oxide and magnesium oxide the fluorescence is of a greenish-white color. With both types of ultraviolet excitation the products display some yellow phosphorescence but not enough to be of commercial interest.

The products of the invention are particularly useful not only because of the brilliance of their fluorescence but also because of their excellent chemical and photochemical stability. For example, in a standard light resistance test comprising exposure of the pigment for 96 hours to the radiation from a S-4 sun lamp-reflector combination at a distance of about 6 inches and at a temperature of about 45° C. and a relative humidity of 95%, darkening of the exposed pigment is very slight, being of the order of 2 or 3 shades darker. Under similar exposure conditions, a comparable zinc sulfide fluorescent pigment turns black.

We claim:

1. The method of activating a pigment mixture composed of a zinc oxide-magnesium oxide base material and about 0.25% to about 5% lithium sulfate by weight of the base material, said base material containing at least about 3% and not more than about 50% of the magnesium oxide by weight of the base material mixture, said method comprising heating the mixture in a reducing atmosphere containing about 2.5% by volume of sulfur dioxide at a temperature within the range of about 850° to 1000° C.

2. A fluorescent pigment comprising the product of calcining in a reducing atmosphere at a temperature within the range of about 850° to 1000° C. a mixture consisting of (1) a base material composed of zinc oxide and magnesium oxide, the magnesium oxide comprising from about 3% to about 40% by weight of the zinc oxide-magnesium oxide mixture, and (2) from about 0.25% to about 5% lithium sulfate by weight of the base material.

3. The method of activating a pigment mixture composed of a zinc oxide-magnesium oxide base material and about 0.25% to about 5% lithium sulfate by weight of the base material, said base material containing at least about 3% and not more than about 50% of the magnesium oxide by weight of the base material mixture, said method comprising heating the mixture in a reducing atmosphere at a temperature within the range of about 850° to 1000° C.

4. The method of activating a pigment mixture composed of a zinc oxide-magnesium oxide base material and about 0.25% to about 5% lithium sulfate by weight of the base material, said base material containing at least about 3% and not more than about 50% of the magnesium oxide by weight of the base material mixture, said method comprising heating the mixture in a reducing atmosphere at a temperature within the range of about 850° to 1000° C., and cooling the resulting product in the absence of oxygen to a temperature not in excess of about 400° C.

5. The method of activating a pigment mixture composed of a zinc oxide-magnesium oxide base material and about 0.25% to about 5% lithium sulfate by weight of the base material, said base material containing at least about 3% and not more than about 50% of the magnesium oxide by weight of the base material mixture, said method comprising heating the mixture in a reducing atmosphere diluted with a gaseous zinc-oxidizing agent of the group consisting of carbon dioxide and water vapor at a temperature within the range of about 850° to 1000° C., and cooling the resulting product in the absence of oxygen to a temperature not in excess of about 400° C.

6. The method of activating a pigment mixture composed of a zinc oxide-magnesium oxide base material and about 0.25% to about 5% lithium sulfate by weight of the base material, said base material containing at least about 3% and not more than about 50% of the magnesium oxide by weight of the base material mixture, said method comprising heating the mixture at a temperature of about 900° C. in a moving reducing atmosphere consisting of about 50% by volume of hydrogen and the balance carbon dioxide, and cooling the resulting product in said atmosphere to a temperature not in excess of about 400° C.

7. A fluorescent pigment comprising the product of calcining in a reducing atmosphere at a temperature within the range of about 850° to 1000° C. a mixture consisting of (1) a base material composed of zinc oxide and magnesium oxide, the magnesium oxide comprising from about 3% to about 50% by weight of the zinc oxide-magnesium oxide mixture, and (2) from about 0.25% to about 5% lithium sulfate by weight of the base material.

8. A fluorescent pigment comprising the product of calcining in a reducing atmosphere at a temperature within the range of about 850° to 1000° C. a mixture consisting of (1) a base material composed of about 88% by weight of zinc oxide and about 12% by weight of magnesium oxide, and (2) about .25% to about 5% lithium sulfate by weight of the base material.

9. A fluorescent pigment comprising the product of calcining in a reducing atmosphere at a temperature within the range of about 850° to 1000° C. a mixture consisting of (1) a base material composed of about 88% by weight of zinc oxide and about 12% by weight of magnesium oxide, and (2) about .2% lithium sulfate by weight of the base material.

LAWRENCE J. REIMERT.
ERASTUS A. FATZINGER.

REFERENCES CITED

The following references are of record in the file of this patent:

UNITED STATES PATENTS

| Number | Name | Date |
|---|---|---|
| 2,028,980 | Korinth | Jan. 28, 1936 |
| 2,245,414 | Roberts | June 10, 1941 |
| 2,285,464 | Ruthruff | June 9, 1942 |